(12) United States Patent
Taki et al.

(10) Patent No.: US 7,880,583 B2
(45) Date of Patent: Feb. 1, 2011

(54) REMOTE CONTROL APPARATUS

(75) Inventors: Naoki Taki, Okazaki (JP); Takeshi Matsumura, Toyota (JP); Tatsunori Kato, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1325 days.

(21) Appl. No.: 11/404,768

(22) Filed: Apr. 17, 2006

(65) Prior Publication Data

US 2006/0255911 A1 Nov. 16, 2006

(30) Foreign Application Priority Data

May 11, 2005 (JP) ............................. 2005-138614

(51) Int. Cl.
*G05D 1/00* (2006.01)

(52) U.S. Cl. ...................... 340/5.72; 340/426.13; 701/2

(58) Field of Classification Search ................ 340/5.72, 340/426.13, 429, 825.69, 825.72, 5.61, 5.64
See application file for complete search history.

(56) References Cited

U.S. PATENT DOCUMENTS 4,672,375 A * 6/1987 Mochida et al. ............ 340/5.72

2003/0024754 A1 * 2/2003 Konno et al. ................ 180/287
2003/0151507 A1 * 8/2003 Andre et al. ........... 340/539.13

FOREIGN PATENT DOCUMENTS

| JP | A 7-59165 | 3/1995 |
| JP | A 2000-59866 | 2/2000 |
| JP | A 2002-61436 | 2/2002 |

\* cited by examiner

*Primary Examiner*—Brian A Zimmerman
*Assistant Examiner*—Yong Hang Jiang
(74) *Attorney, Agent, or Firm*—Oliff & Berridge, PLC

(57) ABSTRACT

A remote control apparatus for a vehicle according to the invention includes a portable-device determination unit, and a distance determination unit. The portable-device determination unit determines whether a first portable device, which can remotely control a vehicle function, is present in the vehicle. The distance determination unit determines whether a distance between the user of the vehicle and the vehicle is greater than or equal to a predetermined distance. When the portable-device determination unit determines that the first portable device is present in the vehicle, and the distance determination unit determines that the distance between the user and the vehicle is greater than or equal to the predetermined distance, the remote control apparatus permits a second portable device, which can remotely control a vehicle function, to remotely control the vehicle function.

17 Claims, 3 Drawing Sheets

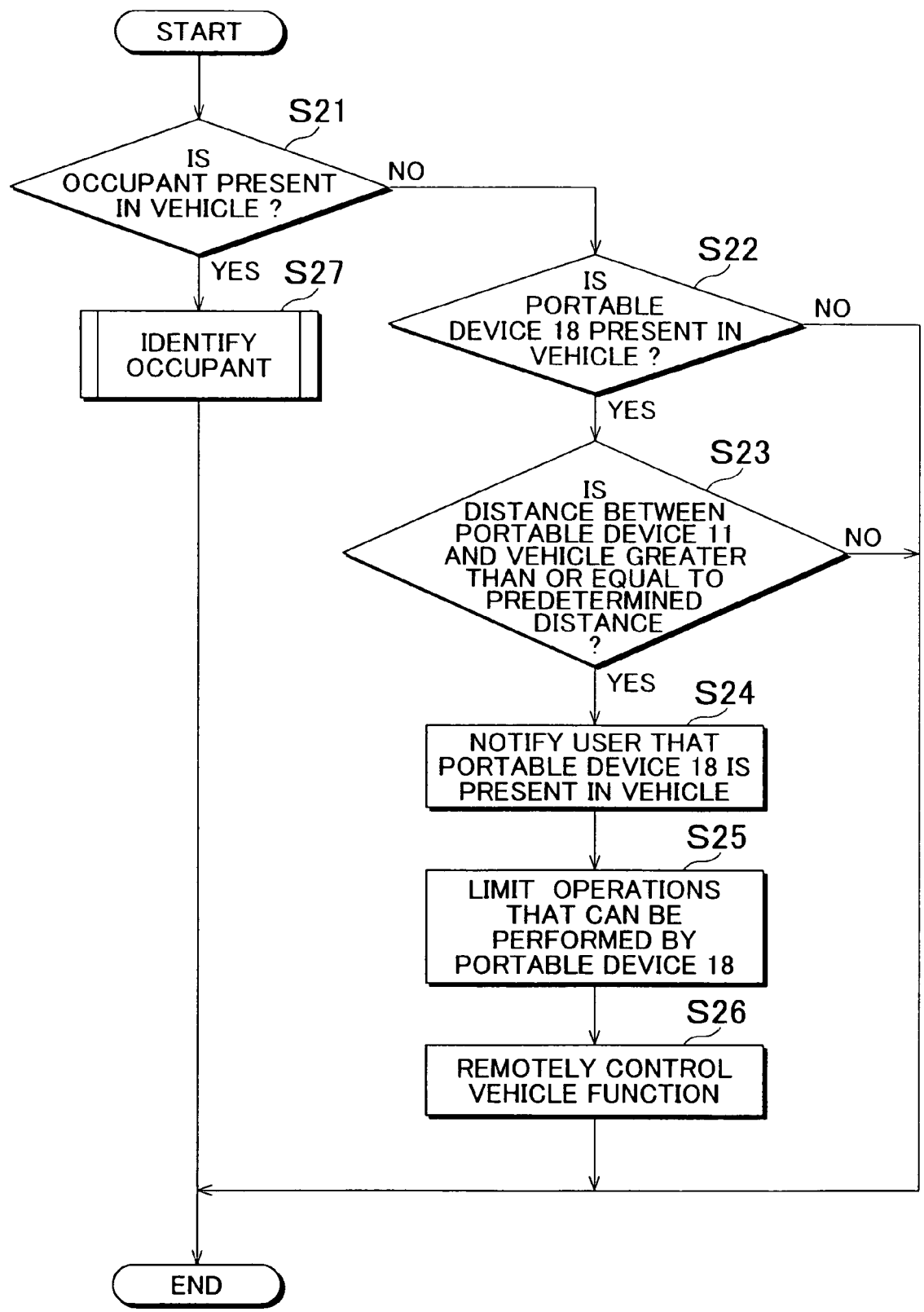

REMOTE CONTROL APPARATUS

INCORPORATION BY REFERENCE

The disclosure of Japanese Patent Application No. 2005-138614 filed on May 11, 2005, including the specification, drawings and abstract is incorporated herein by reference in its entirety.

BACKGROUND OF THE INVENTION

1. Field of the Invention

The invention relates to a remote control apparatus for a vehicle, and more particularly to a remote control apparatus that can remotely control a vehicle function using a portable device.

2. Description of the Related Art

Keyless entry systems are known. In such keyless entry systems, the doors of a vehicle may be unlocked or locked when the user of the vehicle approaches or leaves. Typically, the key of the keyless entry system transmits a signal to a vehicle to remotely control various vehicle functions. In the keyless entry systems, for example, the user may remotely control vehicle functions such as locking/unlocking the doors, opening/closing the windows or a sliding roof, or even controlling the air conditioner from the outside of the vehicle, using the key. An example of such remote control apparatuses is described in Japanese Patent Application Publication No. JP-A-7-59165 (hereinafter, referred to as "Publication No. 7-59165).

In such remote control apparatuses, if the user inadvertently operates the key at a place remote from the vehicle, the user may be unaware that remote control is executed by inadvertently operating the key. For example, the user may unintentionally unlock the doors by inadvertent operation of the key. In the remote control apparatus described in the Publication No. 7-59165, the operations that can be executed by the key of the keyless entry system are limited based on the distance from the vehicle. This avoids the situation where an undesired operation is performed by inadvertently operating the key. Also, because it is convenient to operate a certain vehicle function within a predetermined distance from the vehicle, such a vehicle function can be operated within the predetermined distance. When the operations for the vehicle functions are limited, the operations for all or some of the vehicle functions may be prohibited in Publication No. 7-59165 and in the invention.

However, Publication No. 7-59165 does not describe how the user could execute any controls in the event that the user leaves the key in the vehicle. It would be expected that if the user leaves the key in the vehicle, the operation of the door lock cannot be executed by remote control in the remote control apparatus. As such, the doors may remain unlocked.

Remote control systems in which a vehicle function such as locking/unlocking doors can be remotely controlled using a portable device via a predetermined service center have been proposed. With the remote control systems, a vehicle function such as locking/unlocking the doors can be remotely controlled without using the keyless entry system.

In the majority of such remote control systems, if the vehicle is occupied, the remote control of a vehicle function by the portable device is not permitted. This is because the remote control presumably does not need to be performed using the portable device, and execution of the remote control would likely startle the occupant of the vehicle. However, the presence of an occupant in the vehicle is commonly determined based on whether the key of the keyless entry system responds to a predetermined radio signal. Thus, if the user leaves the key in the vehicle, it is determined that the user is present in the vehicle. Consequently, remote control of the vehicle function by the portable device is not permitted. Accordingly, for example, the doors may remain unlocked, and the door locking function cannot be remotely controlled using the portable device.

SUMMARY OF THE INVENTION

A first aspect of the invention relates to a remote control apparatus for a vehicle, which includes a portable-device determination unit (for example, a keyless entry device) and a distance determination unit. The portable-device determination unit determines whether a first portable device, which can remotely control a vehicle function, is present in a vehicle. The distance determination unit determines whether the distance between the user of the vehicle and the vehicle is greater than or equal to a predetermined distance. When the portable-device determination unit determines that the first portable device is present in the vehicle, and the distance determination unit determines that the distance between the user and the vehicle is greater than or equal to the predetermined distance, the remote control apparatus permits a second portable device, which can remotely control a vehicle function, to remotely control the vehicle function.

With the remote control apparatus according to the first aspect of the invention, it can be determined whether a user has left, for example, the key of the keyless entry system in a vehicle, and remote control of the vehicle function using a portable device is permitted if it is determined that the user has left the key of the keyless entry system in the vehicle.

A second aspect of the invention relates to a remote control apparatus for a vehicle, which includes a portable-device determination unit, and a distance determination unit. The portable-device determination unit determines whether a first portable device, which can remotely control a vehicle function, is present in a vehicle. The distance determination unit determines whether the distance between the user of the vehicle and the vehicle is greater than or equal to a predetermined distance. When the portable-device determination unit determines that the first portable device is present in the vehicle, and the distance determination unit determines that the distance between the user and the vehicle is greater than or equal to the predetermined distance, the remote control apparatus transmits a predetermined signal to a second portable device.

According to the second aspect of the invention, if a user leaves, for example, the key of the keyless entry system in the vehicle, the user is notified that the key of the keyless entry system is present in the vehicle.

In a method for remotely controlling a vehicle function of a vehicle according to the invention, it is determined whether a first portable device, which can remotely control a vehicle function, is present in a vehicle. Also, it is determined whether the distance between the user of the vehicle and the vehicle is greater than or equal to a predetermined distance. When it is determined that the first portable device is present in the vehicle, and it is determined that the distance between the user and the vehicle is greater than or equal to the predetermined distance, a second portable device, which can remotely control a vehicle function, is permitted to remotely control the vehicle function.

Further, in another aspect of the remote control method according to the invention, it is determined whether a first portable device, which can remotely control a vehicle function, is present in a vehicle. Also, it is determined whether the distance between the user of the vehicle and the vehicle is greater than or equal to a predetermined distance. When it is determined that the first portable device is present in the vehicle, and the distance determination unit determines that the distance between the user and the vehicle is greater than or equal to the predetermined distance, a second portable device is transmitted a predetermined signal.

A remote control system according to the invention, which includes a first portable device that can remotely control a vehicle function, a second portable device that can remotely control the vehicle function via a network, and a remote control apparatus that includes a portable-device determination unit that determines whether the first portable device is present in the vehicle, and a distance determination unit that determines whether a distance between a user of the vehicle and the vehicle is greater than or equal to a predetermined distance. When the portable-device determination unit determines that the first portable device is present in the vehicle, and the distance determination unit determines that the distance between the user and the vehicle is greater than or equal to the predetermined distance, the remote control apparatus permits the second portable device to remotely control the vehicle function.

Further, a remote control system according to the invention, which includes a first portable device that can remotely control a vehicle function, a second portable device that can remotely control a vehicle function via a network, and a remote control apparatus that includes a portable-device determination unit that determines whether the first portable device is present in the vehicle, and a distance determination unit that determines whether a distance between a user of the vehicle and the vehicle is greater than or equal to a predetermined distance. When the portable-device determination unit determines that the first portable device is present in the vehicle, and the distance determination unit determines that the distance between the user and the vehicle is greater than or equal to the predetermined distance, the remote control apparatus transmits a predetermined signal to the second portable device.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is an example of a flowchart that shows the flow of processes of determining that a user has left a portable device in a vehicle, and notifying the user that the portable device is present in the vehicle in the remote control system shown in FIG. 1.

DETAILED DESCRIPTION OF THE EXEMPLARY EMBODIMENTS

Hereinafter, example embodiments of the invention will be described with reference to the drawings.

Figure 1:
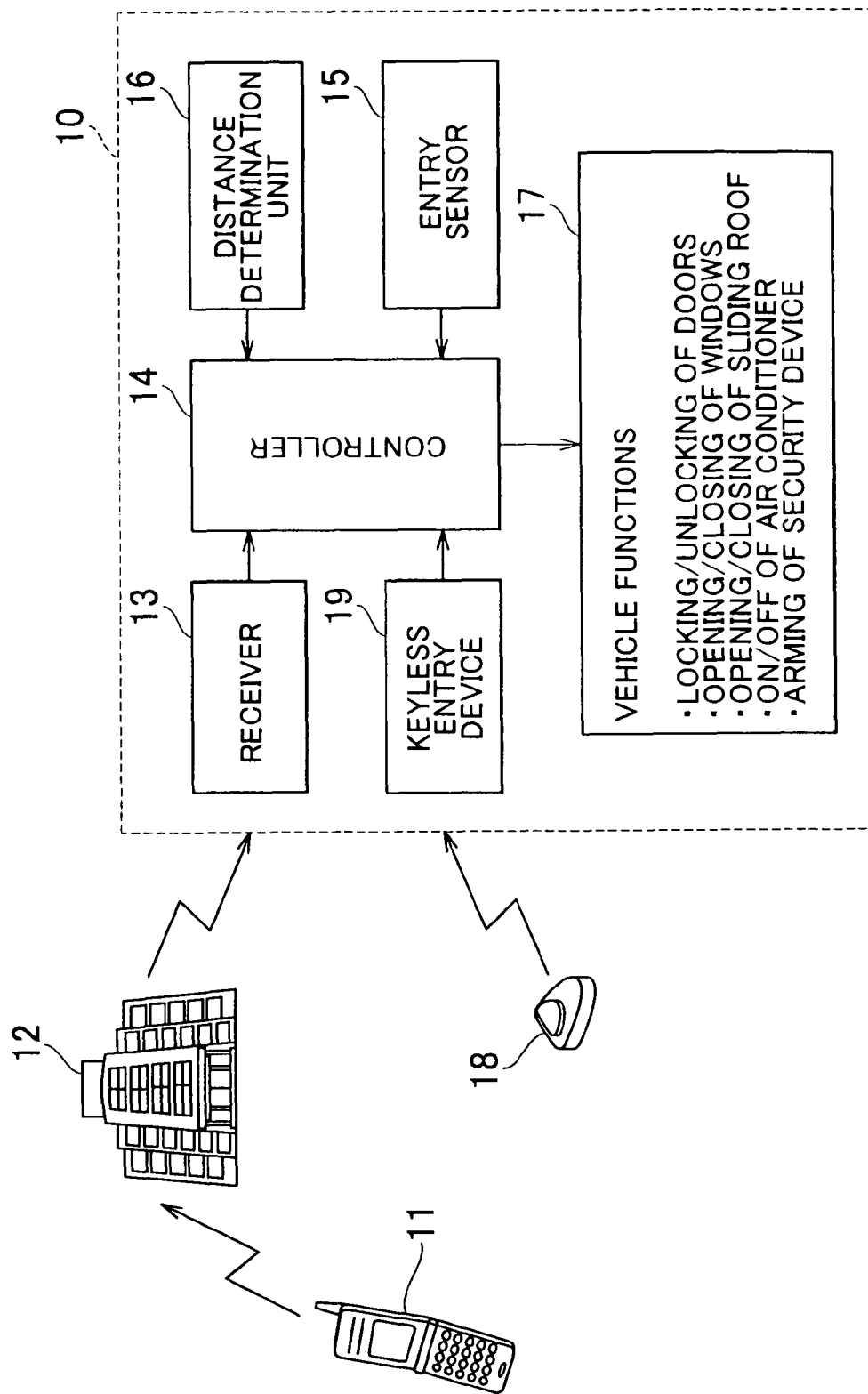
FIG. 1 is a diagram showing the entire configuration of a remote control system in which a remote control apparatus is used, according to an embodiment of the invention.

A first embodiment of the invention will be described. FIG. 1 shows the entire configuration of a remote control system in which a remote control apparatus that can remotely control a vehicle function is used. In the remote control system in FIG. 1, a vehicle function 17 in a remote control apparatus 10 can be remotely controlled using a portable device 11 or a portable device 18.

For example, the portable device 11 may be a mobile phone. The portable device 11 transmits a control signal when a user operates the control button of the portable device 11. The control signal is transmitted to a center 12 via a mobile phone network or a network. The center 12 in turn transmits the control signal to a receiver 13 provided in a specific vehicle.

The receiver 13 receives the control signal from the center 12 through a receiving circuit, and demodulates the control signal. The demodulated control signal is transmitted to a controller 14. The controller 14 determines the operation selected by the user, and executes the selected operation for the vehicle function 17 based on the determination.

For example, the vehicle function 17 may be locking/unlocking the doors, opening/closing the windows or the sliding roof, turning the air conditioner on/off, or arming a security device. The controller 14 drives the actuators that open the door, windows, and sliding roof. Also, the controller 14 executes control to turn on/off the air conditioner and arm/disarm the security device.

The portable device 18 may be a SMART KEY (registered trademark). The SMART KEY includes a transmission portion that stores and transmits a unique ID code. The controller 14 unlocks the door when the portable device 18 is detected, and locks the door when the portable device 18 is not detected. That is, so-called keyless entry control is executed. In the case where a plurality of vehicle functions 17 may be performed, it is not necessary to enable both the portable devices 11 and 18 to control all of the vehicle functions 17. The portable devices 11 and 18 may be configured to control different vehicle functions 17.

A keyless entry device 19 detects that approach of a user carrying the portable device 18 toward the vehicle. Specifically, the keyless entry device 19 transmits a request signal. The portable device 18 transmits the ID code in response to the request signal. The keyless entry device 19 receives the ID code from the portable device 18, and proceeds to determine whether the received ID code matches the ID code stored in the keyless entry device 19. If the keyless entry device 19 determines that the received ID code matches the stored ID code, the keyless entry device 19 transmits, to the controller 14, a signal indicating that the received ID code matches the stored ID code.

When the controller 14 receives the signal indicating that the received ID code matches the stored ID code, the controller 14 determines that the portable device 18 is present, and unlocks the door. The user may continue to operate the portable device 18 to have the controller 14 execute an additional function, such as opening the windows. The controller 14 locks the door when the portable device 18 is no longer present.

When the keyless entry device 19 transmits the request signal but does not receive the ID code from the portable device 18, the keyless entry device 19 may determine that the portable device 18 is not within a predetermined distance from the vehicle, or thus, the user who carries the portable device 18 is not present in the predetermined range from the vehicle.

The portable device 18 can only execute remote control of the vehicle function 17 when the portable device 18 is within the range where the request signal and the ID code can be transmitted between the portable device 18 and the keyless entry device 19. Therefore, the portable device 18 can execute remote control only when the portable device 18 is within a short range from the vehicle, as compared to the portable device 11.

Meanwhile, the strength of the radio signal that conveys the ID code and the like to the keyless entry device 19 from the portable device 18 varies according to the distance between the portable device 18 and the keyless entry device 19. That is, as the distance between the portable device 18 and the keyless entry device 19 increases, the strength of the radio signal decreases. The distance between the portable device 18 and the keyless entry device 19 can be determined using this relation between the distance and the strength of the radio signal. For example, by measuring the strength of the radio signal in advance when the portable device 18 is present in the vehicle, it can be determined whether the portable device 18 is present in the vehicle using the measured strength as a threshold value. The keyless entry device 19 can determine whether the portable device 18 is present in the vehicle based on the strength of the radio signal transmitted from the portable device 18.

A distance determination unit 16 determines whether the distance between the user and the vehicle is greater than or equal to a predetermined distance. A Global Positioning System (GPS) may be provided in the vehicle, and the distance determination unit 16 can determine the current position of the vehicle based on the arrival time of satellite positioning information transmitted from a GPS satellite, and information on the orbit of the GPS satellite.

Because the user carries the portable device 11, the position of the user can be determined by detecting the position of the portable device 11. The current position of the portable device 11 can also be detected using the GPS. The current position of the portable device 11 can also be detected based on the strength of the radio signal transmitted between the portable device 11 and a base transceiver station. The portable device 11 transmits information on the position of the portable device 11 to the vehicle via the center 12. Using the information, the distance determination unit 16 can calculate the distance between the portable device 11 and the vehicle, and can determine whether the distance between the portable device 11 and the vehicle is greater than or equal to the predetermined distance.

For example, the receiver 13 may receive the short-range radio signal transmitted from the portable device 11, and the distance determination unit 16 may determine whether the distance between the portable device 11 and the vehicle is greater than or equal to the predetermined distance, based on the strength of the radio signal. Alternatively, for example, the vehicle may transmit the short-range radio signal, and the distance determination unit 16 may determine whether the distance between the portable device 11 and the vehicle is greater than or equal to the predetermined distance, based on whether the portable device 11 responds to the radio signal. Alternatively, for example, the portable device 11 may transmit the short-range radio signal, and the portable device 11 may determine whether the distance between the portable device 11 and the vehicle is greater than or equal to the predetermined distance, based on whether the vehicle responds to the radio signal. Alternatively, for example, the portable device 11 may receive the short-range radio signal from the vehicle, and the portable device 11 may determine whether the distance between the portable device 11 and the vehicle is greater than or equal to the predetermined distance, based on the strength of the radio signal. When the distance between the portable device 11 and the vehicle is equal to the predetermined distance, it can be determined that the user is present near the vehicle.

An entry sensor 15 detects the presence of any occupants in the vehicle. For example, the entry sensor 15 may include an infrared sensor and a load sensor. The infrared sensor detects infrared energy radiated from a person entering the vehicle. The load sensor detects the load applied to a seat. Thus, these sensors can be used to detect an occupant in the vehicle. The entry sensor 15 may further include a vibration sensor, an opening/closing detection sensor, a glass-breaking sensor, and a pressure sensor. The vibration sensor detects vibrations of the vehicle. The opening/closing detection sensor detects the opening/closing of the door of the vehicle. The glass-breaking sensor detects the vibrations that would be associated with breaking of window glass. The pressure sensor detects changes in air pressure in the vehicle, which may be caused, for example, by opening the door of the vehicle. The sensors can detect when a person has entered the vehicle, and thereby an occupant is present inside the vehicle when the values detected by the sensors exceed respective predetermined threshold values.

Figure 2:
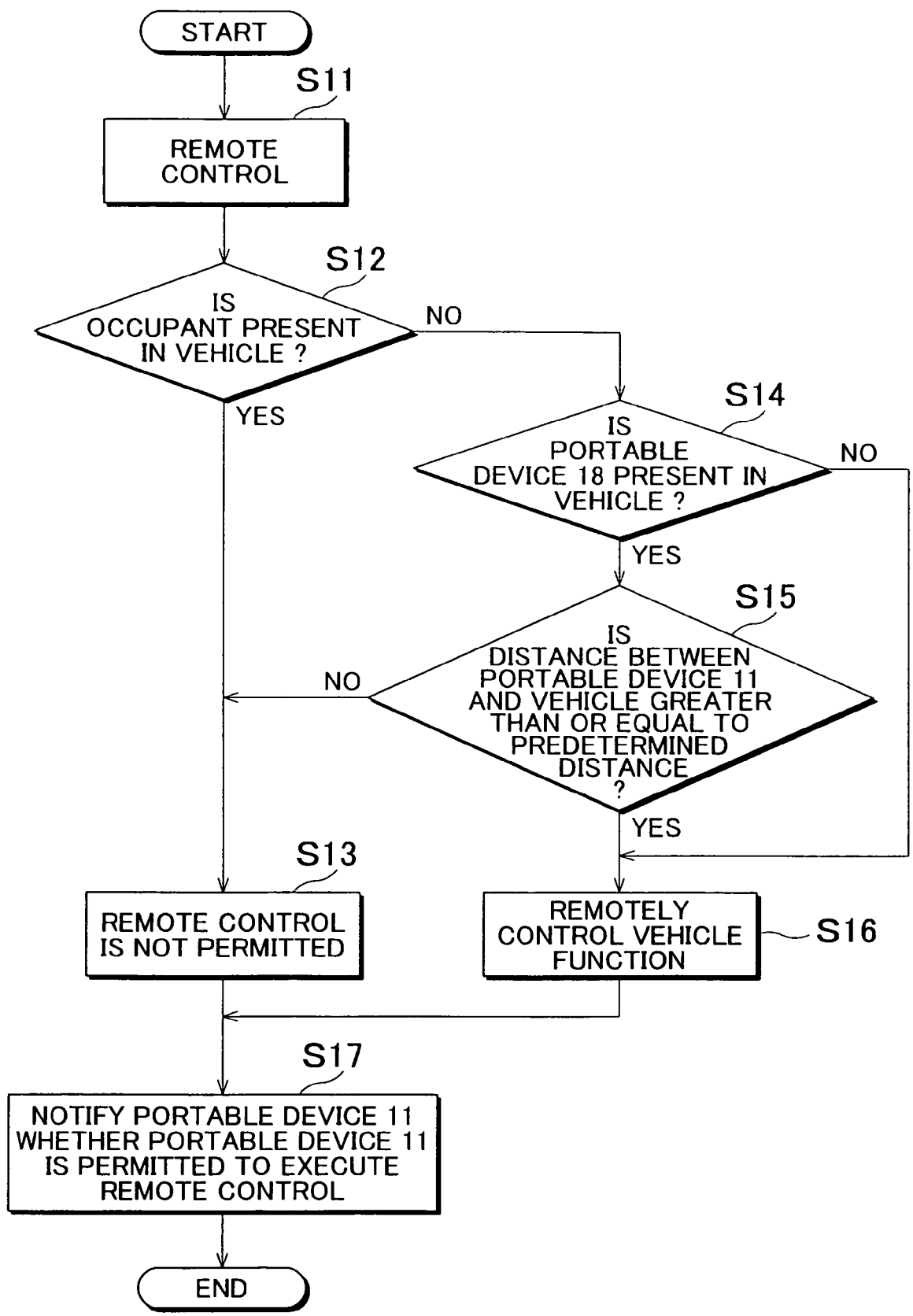
FIG. 2 is an example of a flowchart that shows the flow of processes of remotely controlling a vehicle function in the remote control system shown in FIG. 1.

The flow of processes of remotely controlling the vehicle function 17 in the remote control system shown in FIG. 1 will be described with reference to the flowchart shown in FIG. 2.

The user performs a desired remote control using the portable device 11 (step S11). For example, the user may access a server in the center 12 using the portable device 11, and inputs, to the portable device 11, a password along with the user ID or the unique ID of the mobile phone. The center 12 authenticates the user. The portable device 11 receives authentication from the center 12. The center 12 provides the portable device 11 with contents using HTML or the like, and the portable device 11 displays the contents. The user selects a desired remote control operation from the contents displayed by the portable device 11. After the center 12 authenticates the user, the center 12 receives a control signal for the selected remote control operation from the portable device 11, and transmits the control signal to the remote control apparatus 10 provided in the vehicle.

The remote control apparatus 10 determines whether execution of the remote control is permissible. If an occupant is present in the vehicle, the remote control apparatus 10 does not permit execution of the remote control, because the vehicle function 17 does not need to be remotely controlled. Accordingly, the remote control apparatus 10 determines whether an occupant is present in the vehicle, using the entry sensor 15 (step S12).

If it is determined that an occupant is present in the vehicle (YES in step S12), the remote control apparatus 10 does not permit execution of the remote control (step S13). However, when the remote control apparatus 10 receives the control signal for the remote control, but it is determined that an occupant is present in the vehicle, the remote control apparatus 10 may respond by, for example, capturing an image of the interior of the vehicle and transmitting the image to the user so that the user can identify the occupant.

However, if it is determined that no occupant is present in the vehicle (NO in step S12), the keyless entry device 19 determines whether the portable device 18 is present in the vehicle (step S14).

If it is determined that no occupant is present and no portable device 18 is present in the vehicle (NO in step S14), it can be estimated that the user has left the vehicle with the portable device 18, and thus, that the user has left the vehicle intentionally. Therefore, the remote control apparatus 10 permits execution of the remote control, and executes the remote control of the selected vehicle function 17 (step S16).

If it is determined that no occupant is present but the portable device 18 is present in the vehicle (YES in step S14), the user may have left the portable device unintentionally. Therefore, the distance determination unit 16 in the remote control apparatus 10 then determines whether the distance between the portable device 11 and the vehicle is greater than or equal to the predetermined distance (step S15). Based on this determination, it can be determined whether the user has left the vehicle temporarily and is present near the vehicle, or the user has left the portable device 18 in the vehicle.

Accordingly, when the distance between the portable device 11 and the vehicle is less than the predetermined distance (NO in step S15), it is determined that the user is present near the vehicle. Then, the remote control apparatus 10 does not permit execution of the remote control (step S13) because the vehicle function 17 does not need to be remotely controlled.

The distance determination unit 16 may determine whether the distance between the portable device 11 and the vehicle is greater than or equal to the predetermined distance when the remote control apparatus 10 receives the control signal for the remote control. In this case, the remote control apparatus 10 notifies the portable device 11 that execution of the remote control is not permitted at a time point when it is determined that the distance is less than the predetermined distance.

If it is determined that the distance between the portable device 11 and the vehicle is greater than or equal to the predetermined distance (YES in step S15), it is determined that the user has left the portable device 18. Therefore, the remote control apparatus 10 permits execution of the remote control. That is, the remote control of the selected vehicle function 17 is executed (step S16). Accordingly, it can be accurately determined whether the user has left the portable device 18 in the vehicle. When it is determined that the user has left the portable device 18 in the vehicle, the vehicle function 17 can be remotely controlled even if the portable device 18 is in the vehicle.

The remote control apparatus 10 notifies the portable device 11 via the center 12 whether execution of the remote control is permitted (step S17). If it is determined that execution of the remote control is not permitted, the remote control apparatus 10 notifies the portable device 11 that the remote control was not executed and provides a reason why execution of the remote control is not permitted. If it is determined that execution of the remote control is permitted, the remote control apparatus 10 transmits, to the portable device 11, information on the remote control and the result of the remote control. Accordingly, the user can determine whether the remote control of the selected vehicle function 17 has been executed. Also, when execution of the remote control is not permitted, the user is notified of the reason why execution of the remote control is not permitted.

Accordingly, the remote control apparatus according to the first embodiment of the invention can accurately determine whether the user has left the portable device 18 in the vehicle. When it is determined that the user has left the portable device 18 in the vehicle, the vehicle function 17 can be remotely controlled.

A second embodiment of the invention will be described. In the second embodiment, the processes follow the flowchart shown in FIG. 3 instead of the flowchart of processes shown in FIG. 2 in the remote control system in the first embodiment of the invention shown in FIG. 1. In the second embodiment, the remote control apparatus determines that the user has left the portable device 18 in the vehicle, and notifies the user that the portable device 18 is present in the vehicle. FIG. 3 is an example of a flowchart showing the flow of processes of determining that the user has left the portable device 18 in the vehicle, and notifying the user that the portable device 18 is present in the vehicle.

The remote control apparatus 10 executes the processes in FIG. 3, for example, after a predetermined time has elapsed since the engine stops. First, the entry sensor 15 in the remote control apparatus 10 determines whether an occupant is present in the vehicle (step S21).

If it is determined that an occupant is present in the vehicle (YES in step S21), it is then determined whether the occupant is a person who does not have a malicious intent, such as the user or someone that the user knows (step S27). For example, the remote control apparatus 10 may capture an image of the interior of the vehicle, and transmit the image to the user so that the user can determine whether the occupant is someone that the user knows.

If it is determined that no occupant is present in the vehicle (NO in step S21), the keyless entry device 19 determines whether the portable device 18 is present in the vehicle (step S22).

If it is determined that no occupant is present and no portable device 18 is present in the vehicle (NO in step S22), it can be estimated that the user has left the vehicle with the portable device 18. Therefore, the routine shown in FIG. 3 is terminated.

However, if it is determined that no occupant is present but the portable device 18 is present in the vehicle (YES in step S22), the user may have left the portable device 18 unintentionally. Therefore, the distance determination unit 16 in the remote control apparatus 10 determines whether the distance between the portable device 11 and the vehicle is greater than or equal to the predetermined distance (step S23). On the basis of the determination, it can be determined whether the user has left the vehicle temporarily and the user is present near the vehicle, or the user has left the portable device 18 in the vehicle.

If it is determined that the distance between the portable device 11 and the vehicle is less than the predetermined distance (NO in step S23), it is determined that the user is near the vehicle, and the user has left the portable device 18 intentionally. Therefore, the routine shown in FIG. 3 is terminated.

If it is determined that the distance between the portable device 11 and the vehicle is greater than or equal to the predetermined distance (YES in step S23), the remote control apparatus 10 determines that the user has left the portable device 18 in the vehicle, and notifies the portable device 11 (user) that the portable device 18 is present in the vehicle (step S24).

Because the distance between the user and the vehicle is greater than or equal to the predetermined distance, the user does not operate the vehicle function 17 using the portable device 18. Therefore, the remote control apparatus 10 prohibits or limits the operation for the vehicle function 17 that is performed by the portable device 18 (step S25). This avoids the situation where, for example, an individual the user does not know enters the vehicle, starts the engine using the portable device 18, and drives the vehicle, or locks the door maliciously using the portable device 18.

When the user is notified that the portable device 18 is present in the vehicle by the portable device 11, the user remotely controls the vehicle function 17 using the portable device 11 (step S26). For example, the user may lock the doors of the vehicle by remote control, because it is determined that the door has not been locked when the portable device 18 is in the vehicle. Also, the user arms the security device to detect unexpected start of the engine, theft, or the like, by remote control.

In this embodiment, if the user leaves the portable device 18 in the vehicle, the user can be notified that the portable device 18 is present in the vehicle. Also, the distance between the vehicle and user can be detected. Accordingly, even if the portable device 18 is present in the vehicle, the portable device 11 is permitted to execute the remote control. For example, the doors may be locked by remote control. As a result, security of the vehicle can be enhanced.

As described above, in the remote control apparatus according to the second embodiment of the invention, even if the user leaves the portable device 18 (e.g., the key of the keyless entry system) in the vehicle, it can be accurately determined that the user has left the key in the vehicle, and the vehicle function can be remotely controlled. Also, the user is notified that the key is present in the vehicle. Therefore, the user can control the vehicle function by remote control. As a result, the security of the vehicle is enhanced.

What is claimed is:

1. A remote control apparatus for a vehicle, comprising:
   a portable-device determination unit that determines whether a first portable device, which can remotely control a vehicle function, is present in a vehicle; and
   a distance determination unit that determines whether a distance between a user of the vehicle and the vehicle is greater than or equal to a predetermined distance, wherein when the portable-device determination unit determines that the first portable device is present in the vehicle, and the distance determination unit determines that the distance between the user and the vehicle is greater than or equal to the predetermined distance, the remote control apparatus permits a second portable device, which can remotely control a vehicle function, to remotely control the vehicle function.

2. The remote control apparatus according to claim 1, further comprising:
   an occupant determination unit that determines whether an occupant is present in the vehicle, wherein when the occupant determination unit determines that no occupant is present in the vehicle, the remote control apparatus permits the second portable device to remotely control the vehicle function.

3. The remote control apparatus according to claim 2, wherein the distance determination unit determines whether the distance between the user and the vehicle is greater than or equal to the predetermined distance, based on a distance between the vehicle and the second portable device carried by the user of the vehicle.

4. The remote control apparatus according to claim 1, wherein the distance determination unit determines whether the distance between the user and the vehicle is greater than or equal to the predetermined distance, based on a distance between the vehicle and the second portable device carried by the user of the vehicle.

5. The remote control apparatus according to claim 1, wherein the first portable device includes a transmission portion that stores and transmits a unique identification code.

6. The remote control apparatus according to claim 1, wherein the second portable device is a mobile phone.

7. A remote control apparatus for a vehicle, comprising:
   portable-device determination means for determining whether a first portable device, which can remotely control a vehicle function, is present in a vehicle; and
   distance determination means for determining whether a distance between a user of the vehicle and the vehicle is greater than or equal to a predetermined distance, wherein when the portable-device determination means determines that the first portable device is present in the vehicle, and the distance determination means determines that the distance between the user and the vehicle is greater than or equal to the predetermined distance, the remote control apparatus permits a second portable device, which can remotely control a vehicle function, to remotely control the vehicle function.

8. A remote control apparatus for a vehicle, comprising:
   a portable-device determination unit that determines whether a first portable device, which can remotely control a vehicle function, is present in a vehicle; and
   a distance determination unit that determines whether a distance between a user of the vehicle and the vehicle is greater than or equal to a predetermined distance, wherein when the portable-device determination unit determines that the first portable device is present in the vehicle, and the distance determination unit determines that the distance between the user and the vehicle is greater than or equal to the predetermined distance, the remote control apparatus transmits a predetermined signal to a second portable device.

9. The remote control apparatus according to claim 8, wherein when the distance determination unit determines that the distance between the user and the vehicle is greater than or equal to the predetermined distance, the remote control apparatus prohibits or limits an operation for the vehicle function that is performed by the first portable device, and permits the second portable device, which can remotely control the vehicle function, to remotely control the vehicle function.

10. The remote control apparatus according to claim 9, wherein the distance determination unit determines whether the distance between the user and the vehicle is greater than or equal to the predetermined distance, based on a distance between the vehicle and the second portable device carried by the user of the vehicle.

11. The remote control apparatus according to claim 8, wherein the first portable device stores a unique identification code, and includes a transmission portion that transmits the identification code.

12. The remote control apparatus according to claim 8, wherein the second portable device is a mobile phone.

13. A remote control apparatus for a vehicle, comprising:
    portable-device determination means for determining whether a first portable device, which can remotely control a vehicle function, is present in a vehicle; and
    distance determination means for determining whether a distance between a user of the vehicle and the vehicle is greater than or equal to a predetermined distance, wherein when the portable-device determination means determines that the first portable device is present in the vehicle, and the distance determination means determines that the distance between the user and the vehicle is greater than or equal to the predetermined distance, the remote control apparatus transmits a predetermined signal to a second portable device.

14. A remote control method for a vehicle, comprising:
    determining by a first unit whether a first portable device, which can remotely control a vehicle function, is present in a vehicle;
    determining by a second unit whether a distance between a user of the vehicle and the vehicle is greater than or equal to a predetermined distance; and
    permitting a second portable device, which can remotely control a vehicle function, to remotely control the vehicle function when it is determined that the first portable device is present in the vehicle, and the distance between the user and the vehicle is greater than or equal to the predetermined distance.

15. A remote control method for a vehicle, comprising:
  determining by a first unit whether a first portable device, which can remotely control a vehicle function, is in a vehicle;
  determining by a second unit whether a distance between a user of the vehicle and the vehicle is greater than or equal to a predetermined distance; and
  transmitting a predetermined signal to a second portable device when it is determined that the first portable device is present in the vehicle, and the distance between the user and the vehicle is greater than or equal to a predetermined distance.

16. A remote control system, comprising:
  a first portable device that can remotely control a vehicle function;
  a second portable device that can remotely control the vehicle function via a network; and
  a remote control apparatus that includes a portable-device determination unit that determines whether the first portable device is present in the vehicle, and a distance determination unit that determines whether a distance between a user of the vehicle and the vehicle is greater than or equal to a predetermined distance, wherein when the portable-device determination unit determines that the first portable device is present in the vehicle, and the distance determination unit determines that the distance between the user and the vehicle is greater than or equal to the predetermined distance, the remote control apparatus permits the second portable device to remotely control the vehicle function.

17. A remote control system, comprising:
  a first portable device that can remotely control a vehicle function;
  a second portable device that can remotely control a vehicle function via a network; and
  a remote control apparatus that includes a portable-device determination unit that determines whether the first portable device is present in the vehicle, and a distance determination unit that determines whether a distance between a user of the vehicle and the vehicle is greater than or equal to a predetermined distance, wherein when the portable-device determination unit determines that the first portable device is present in the vehicle, and the distance determination unit determines that the distance between the user and the vehicle is greater than or equal to the predetermined distance, the remote control apparatus transmits a predetermined signal to the second portable device.

* * * * *